(No Model.)

A. JENNINGS.
COVER FOR PAILS, &c.

No. 245,635. Patented Aug. 16, 1881.

WITNESSES:
H. L. Bennem.
John H. Ives.

INVENTOR:
Augustus Jennings
by Phillips Abbott
ATTORNEY.

UNITED STATES PATENT OFFICE.

AUGUSTUS JENNINGS, OF SOUTHPORT, CONNECTICUT.

COVER FOR PAILS, &c.

SPECIFICATION forming part of Letters Patent No. 245,635, dated August 16, 1881.

Application filed June 7, 1881. (No model.)

*To all whom it may concern:*

Be it known that I, AUGUSTUS JENNINGS, of Southport, in the county of Fairfield and State of Connecticut, have invented a new and useful Improvement in Covers for Pails, Pots, and Similar Vessels, which I fully describe and set forth in the following specification, and show in the accompanying drawings, in which like letters of reference indicate like parts.

Figure 1:
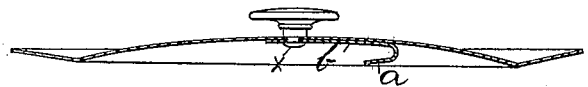
Figure 2:
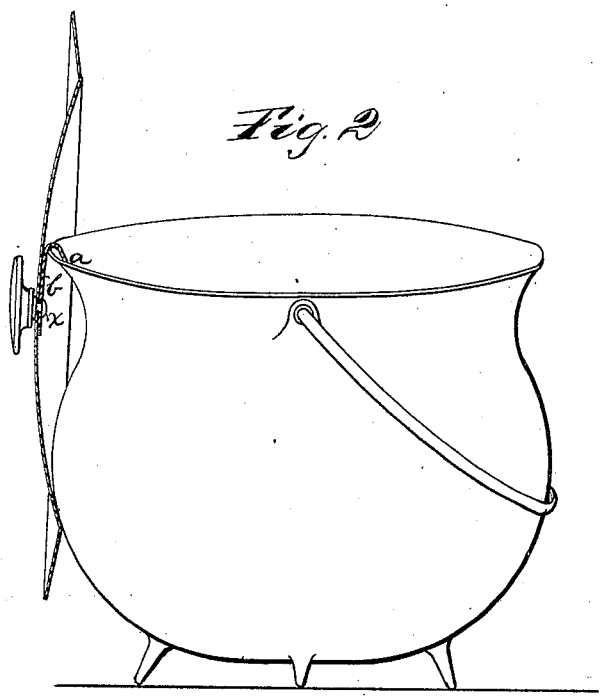
Figure 3:
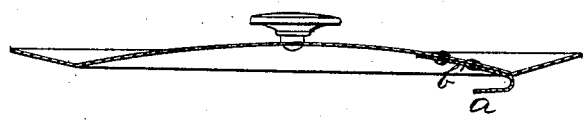

Figure 1 shows a section of a pail-cover through the center of the hook. Fig. 2 shows the cover in position when the invention is used. Fig. 3 shows an alternative method of applying the hook.

My invention affords a convenient and always operative means of disposing of the cover of a pail, pot, or similar vessel when the cover has temporarily to be removed in order to get at the contents of the vessel, thus allowing both hands to be free and avoiding dripping of the condensed steam on the floor, and the inconvenience of finding a place where the cover may be laid down, and is as follows:

I fasten to the center of the under side of the cover a hook, (seen at *a*, Figs. 1 and 2,) the bar or straight portion of which hook (seen at *b*, Figs. 1 and 2) extends radially from the center of the cover toward its rim, and the hooked portion of it bends downwardly and then back toward the center of the cover.

To save expense in the manufacture I prefer to have the shank of the lifting-knob of the cover pass through the bar of the hook, as seen at *x* in Figs. 1 and 2, so that the same shank which fastens the lifting-knob may at the same time serve to fasten the hook. The hook may, however, be soldered in position, or otherwise secured.

The utility of my invention and its method of use are apparent from Fig. 2. The cover having been removed from the vessel is hung to the side thereof by means of the hook, which is caught over the rim of the vessel, and it there remains until replaced on the vessel.

The hook may be fastened near the outer edge of the cover, as seen in Fig. 3, instead of at the center; but wherever the hook shall be placed the distance from the curved portion thereof to that part of the cover which is farthest removed from the curved portion should not exceed the distance from the upper rim of the pot or pail to the bottom thereof externally.

Having described my invention, I claim—

1. A cover provided with a hook so located thereon that the cover may be suspended from the upper rim of the pot or pail, substantially as and for the purposes set forth.

2. A cover provided with a hook which is fastened to the cover by the shank of the lifting-knob, substantially as and for the purposes set forth.

AUGUSTUS JENNINGS.

Witnesses:
HENRY DORN,
PHILLIPS ABBOTT.